United States Patent [19]

Costes et al.

[11] 3,799,478

[45] Mar. 26, 1974

[54] EJECTOR FOR JETTISONING LOADS FROM AIRCRAFTS

[75] Inventors: Bertrand Marie Dominique Costes; Pierre Fernand Coutin, both of Paris; Jean Henri Marie Hasquenoph, Lagney, all of France

[73] Assignee: Etat Francais, represent par le Ministre de la Defense Nationale, Delegation Ministerielle pour l'Armentand R. Alkan & Cie, Paris, France

[22] Filed: Sept. 8, 1972

[21] Appl. No.: 287,355

[52] U.S. Cl. ............................ 244/137 R, 89/1.56
[51] Int. Cl. ............................................. B64d 1/04
[58] Field of Search ..... 244/137 R; 89/1.5 R, 1.5 F, 89/1.5 G; 294/83 AE, 83 R

[56] References Cited
UNITED STATES PATENTS
3,273,459   9/1966   Lardin............................ 244/137 R
2,869,916   1/1959   Benson........................... 244/137 R
2,889,746   6/1959   Glassman et al................ 244/137 R
2,829,561   4/1958   Granfelt......................... 244/137 R FOREIGN PATENTS OR APPLICATIONS
744,609   2/1956   Great Britain.................. 244/137 R

*Primary Examiner*—Duane A. Reger
*Assistant Examiner*—Galen L. Barefoot

[57] ABSTRACT

This ejector for jettisoning a load from an aircraft comprises a thrust mechanism responsive to the release control action exerted on the ejector and in the preferred embodiment a pair of cam extensions are associated with the thrust mechanism for exerting a kinematic and positioning action on points disposed longitudinally at spaced intervals on said load, so as to lower said points equally or differentially according to the desired nose-dive or tail-down position in which it is desired to jettison the load.

4 Claims, 7 Drawing Figures

EJECTOR FOR JETTISONING LOADS FROM AIRCRAFTS

BACKGROUND OF THE INVENTION

This invention relates in general to ejectors of the so-called jettisoning type for releasing loads from aircrafts.

DESCRIPTION OF THE PRIOR ART

For jettisoning loads from an aircraft a known proposition consisted in providing at the rear end of the load retained for example by hook means under the fuselage or wings of an aircraft a retaining means permitting the pivoting of the load preliminary to a nose-dive, at the beginning of the jettisoning thereof, ans such that the load was released completely only when its inclination was sufficient to prevent the load from striking any element of the aircraft after this release.

However, the necessity of anchoring the load adjacent its rear end is objectionable because it makes the structure unduly complicated.

SUMMARY OF THE INVENTION

It is the essential object of the present invention to provide an improved ejector construction for jettisoning a load from an aircraft or the like with a view to cause the load to pivot to a nose-dive position during the load release or jettisoning operation, without resorting to any additional means for retaining the rear end of the load, this ejector being controlled through known means such as the combustion gas released from a pyrotechnical generator.

In certain specific applications it may be desired to release the load in a horizontal position or even while imparting a reverse rotation thereto, i.e., in the so-called "tail-down" position. The improved ejector of this invention is also capable of producing these different jettisoning positions by using the same conventional means, as will become clearly apparent from the following description.

To obtain the release characteristics broadly set forth hereinabove, the ejector according to this invention is characterised essentially in that it comprises a thrust mechanism responsive to the release of the ejector proper and associated with means operative on a certain longitudinal extent of the load at points responsive to kinematic control means such that they are lowered equally or differentially in order to set the load in the desired longitudinal position. Thus, if it is desired to impart a nose-dive angular position to the load, the points engaged by said thrust means will be lowered to a greater extent at the front than at the rear of the load, so that the desired pivotal movement will be imparted to the load, for example about an imaginary transverse axis of rotation located at the rear of the load, or even beyond the rear end thereof, the momentary axis of rotation of the load being either fixed or shiftable during this pivotal movement. Therefore, with the improved ejector according to this invention it is possible to dispense with the use of separable retaining means at the rear end of the load while simplifying considerably the load suspension operation as well as the construction of the release or jettisoning mechanisms, while affording the possibility of selecting at will the pivotal movement to be produced at the beginning of the jettisoning operation, since this movement is no more tributary of the position of a retaining device disposed at the rear end of the load.

The present invention is applicable to the jettisoning of miscellaneous loads such as auxiliary fuel tanks, equipment containers, weapon loads, bombs, etc.

The general pivoting means constituting the present invention may be embodied in various constructional forms of which a few examples will now be described by way of illustration, notably with reference to means for obtaining a nose-dive position of the load during the release, with reference to the attached drawings, in which:

DESCRIPTION OF THE PREFERRED EMBODIMENTS

Figure 1:
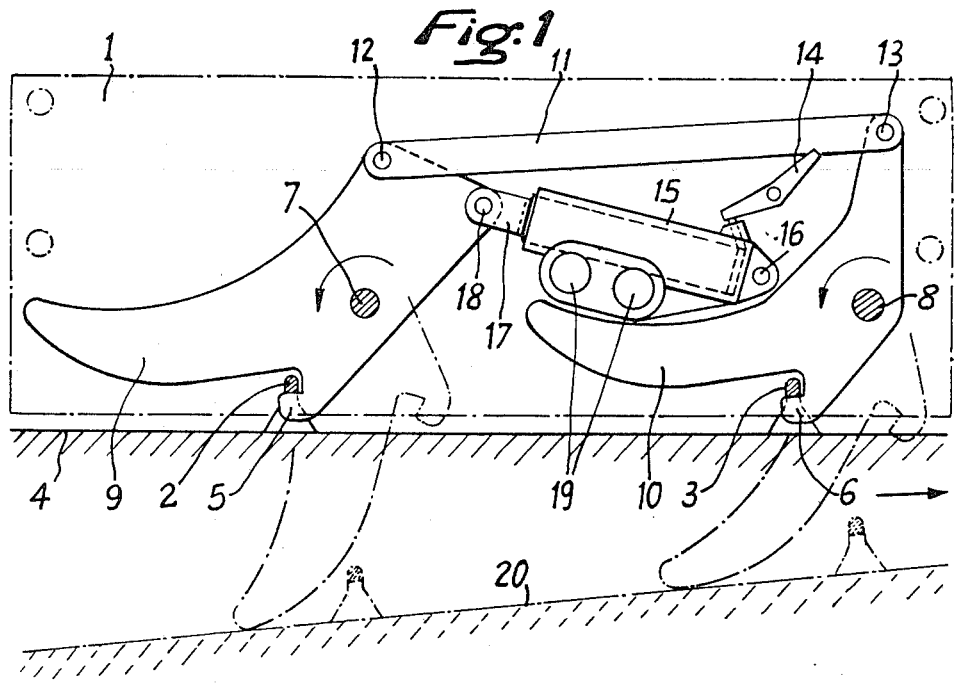
FIG. 1 is a diagrammatic longitudinal view of an ejector comprising a suspension and thrust mechanism consisting of a pair of pivoting members disposed tandemwise and interconnected by means controlling different degrees of downward travel of said members when the ejector is released.

Referring first to the exemplary form of embodiment illustrated in FIG. 1, the straight chain-dotted lines designate the over-all dimensions of the ejector 1. This ejector 1 is normally adapted to retain the load through a pair of anchor rings 2, 3 secured to the uppermost surface 4 of said load by means of a pair of hooks 5, 6. These hooks 5, 6 pivoted to pins 7, 8 of the ejector mechanism are each formed with a cam extension 9, 10. A coupling rod 11 and a pair of pivot pins 12, 13 interconnect these hooks so that the pivotal movement of one anchor hook positively entails the same movement of the other anchor hook. However, this pivotal movement is normally prevented by a catch means 14 of any known type.

A cylinder 15 pivoted to a fixed pin 16 has slidably fitted therein a piston 17 operatively connected to the hook 5 through a connecting pin 18. One or a plurality of pyrotechnical pulse generators 19 are adapted to supply gas under pressure to said cylinder 15 under the control of an electric signal.

The pressure thus created in cylinder 15 will firstly release the catch means 14, then exert a thrust against the piston 17 for rocking the hooks 5, 6 and their cam extensions 9, 10 in the direction of the arrows about the pivot pins 7, 8. During this movement of rotation hooks 5, 6 release the rings 2, 3, and the cams 9, 10 exert a relatively strong thrust against the upper surface 4 of the load, thus causing this load to gradually assume a lower position, shown in dash and dot lines, wherein said surface lies at 20.

It is clear that the contour of said cam extensions 9, 10 and the locations of the pivot pins 12, 13 of coupling rod 11 may be such that the ejector when operated causes the load to move from the initial position 4 to the release position 20 by "nose-diving" through a certain angle about a fictitious or imaginary centre located at the rear in the direction of the arrow at the right-hand and lower corner of FIG. 1.

By using similar means and a different choice of the kinematic means interconnecting the cam extensions 9, 10, it would also be possible, in lieu of a nose-dive angular movement, to produce a simple downward movement of translation of the load or even a reverse rotation setting the load in a "tail-down" position.

Figure 2:
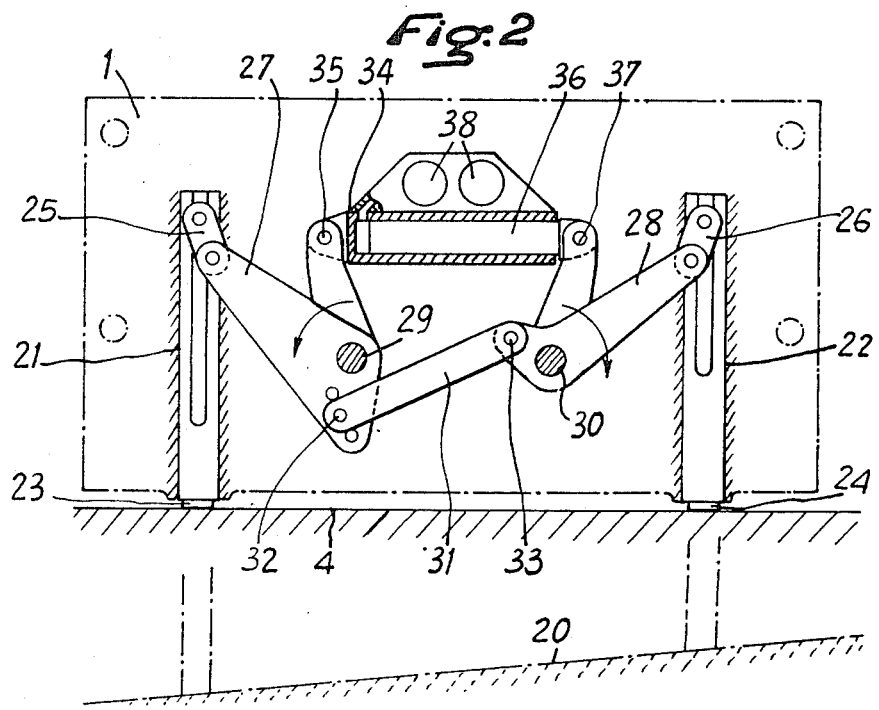
FIGS. 2 and 3 are diagrammatic longitudinal views showing two exemplary forms of embodiment of ejectors comprising two vertical thrust members disposed tandemwise and interconnected by means adapted to impart different strokes to said members.

FIG. 2 illustrates only the ejector system, assuming that the load suspension and release means are of a known type. The ejector 1, of which the over-all dimensions are shown in chain-sotted lines, comprises a pair of slideways 21, 22 slidably engaged by corresponding pistons 23, 24. These pistons have their upper ends connected through links 25, 26 to a pair of bell-crank levers 27, 28, respectively, fulcrumed to fixed pivot pins 29, 30 of the ejector. A coupling rod 31 interconnects these levers by means of pivot pins 32, 33 so that when one lever is rotated the other lever is rotated in the opposite direction.

The pivot pin 32 may be located at a variable distance from the lever fulcrum 29 to permit the desired modification of the relative amplitude of the angular excursion of said levers 27, 28 about their fulcrums 29, 30, respectively. A floating cylinder 34 connected through a pivot pin 35 to lever 27 has slidably fitted therein a piston 36 connected through a pivot pin 37 to the other lever 28.

When fluid under pressure is supplied to cylinder 34 as a consequence of the firing of pyrotechnical pulse generators 38, the pivot points 35 and 37 move away from each other and cause the levers 27, 28 to rotate in the direction of the arrows. The pistons 23 and 24 are thus driven downwards and exert a relatively strong thrust against the upper surface 4 of the load.

According to the lever ratio selected at 32, the stroke of piston 23 is longer than that of piston 24. The load surface 4 assumes the position shown in phantom lines at 20 by pivoting about an imaginary centre at the rear thereof.

Figure 3:
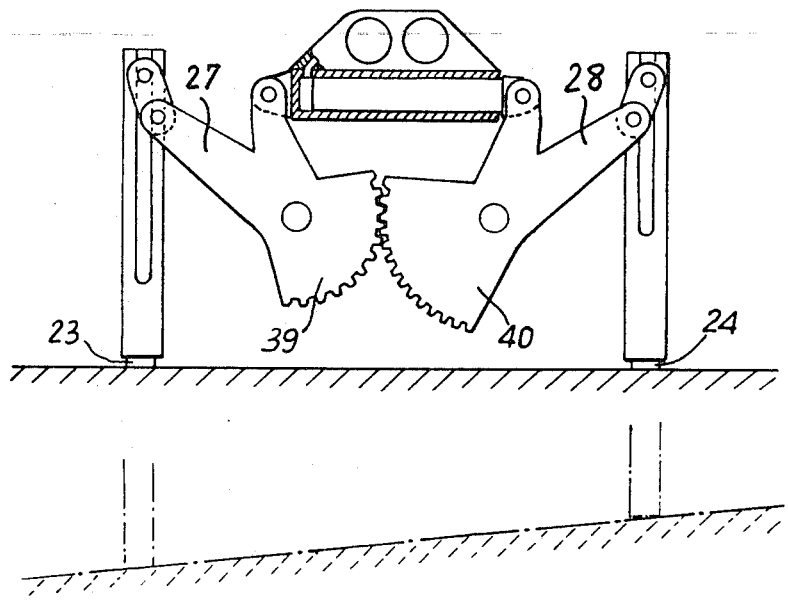

FIG. 3 illustrates a device similar to the one shown in FIG. 2 but wherein the unequal strokes of pistons 23 and 24 are obtained by using a pair of toothed segments 39 and 40 having different radii, which are rigid with bell-crank levers 27, 28, respectively, and in constant meshing engagement with each other.

Figure 4:
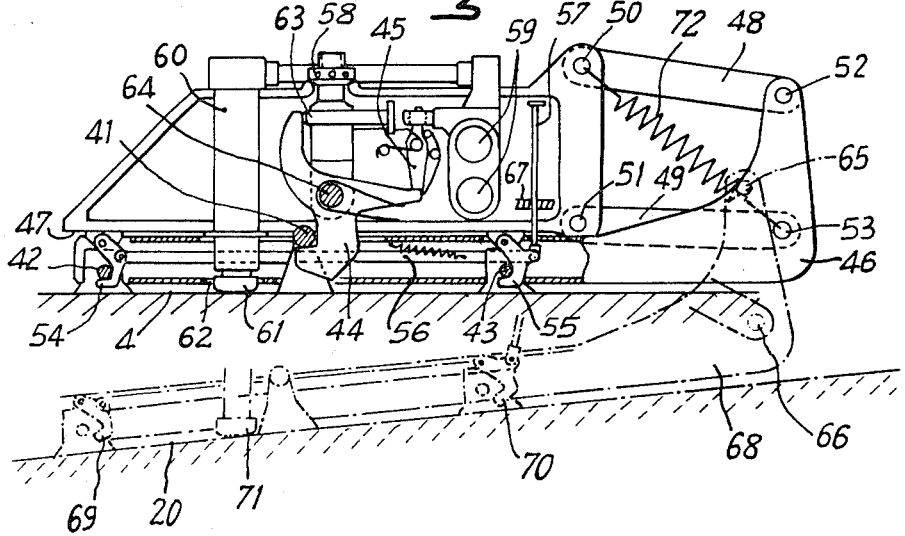
FIGS. 4 and 5 illustrate further examples of an ejector having a longitudinal suspension arm connected to the fixed structure element of the ejector through a mechanism adapted to set said arm in the desired angular position when the jettisoning thrust is exerted on said arm or on the load before releasing the latter.

In FIG. 4 the uppermost surface of the load is still designated by the reference numeral 4 and three suspension points, i.e., a main central anchor ring 41 and a pair of auxiliary anchor rings 42 and 43, are utilized.

The load is normally suspended through its anchor ring 41 from the main hook 44 locked by a catch device 45 of known type. The ejector comprises an arm 46 positioned between the lower portion 47 of the ejector proper and the upper surface 4 of the load. This arm is connected to the ejector through a pair of links 48, 49 forming therewith an irregular parallel motion. The pivot pins 50, 51 carried by the ejector are fixed, and pivot pins 52, 53 are carried by arm 46. This arm 46 also carries a pair of auxiliary hooks 54, 55 engaging the auxiliary suspension rings 42 and 43 of the load. They are interconnected by a rod 56 rigid with a pulling knob 57. Optionally, a screw and nut device 58 may be provided for lifting the main hook 44 in order to urge the load against some bearing means (not shown).

Pyrotechnic pulse generators 59 are adapted, when energized through an electric signal, to generate a fluid pressure within a cylinder 60 slidably engaged by a piston 61 engaging with its outer end the upper surface 4 of the load through an aperture 62 formed in said arm 46. The gas pressure actuates firstly the catch device 45 and, with the assistance of release piston 63, retracts the hook 44 pivoted at 64.

The load is then strongly pushed downwards by the piston 61 and carries along the arm 46 connected thereto through the still closed auxiliary hooks 54 and 55. The unequal or irregular parallel-motion 50, 51, 52, 53 is changed to 50, 51, 65, 66, thus causing the arm 46 to rotate during its downward movement, the load performing the same movement about an imaginary centre 0.

Upon completion of the piston stroke, the pulling knob 57 is retained by the abutment member 67 and actuates the connecting-rod 56, so that the hooks 54 and 55 are opened in turn. Under these conditions, the upper surface 4 is moved to 20 and the load is released completely. The arm 46 is now in position 68, the auxiliary hooks 54, 55 assume their open positions 69, 70 and the ejector piston 61 is in position 71. This arrangement is characterised notably in that the load is driven positively until the stroke is completed, without any possibility of departure from the successive positions to be imparted thereto. Spring means such as 72 are provided for returning the arm to its initial position 46 after the load has been released or jettisoned.

Figure 5:
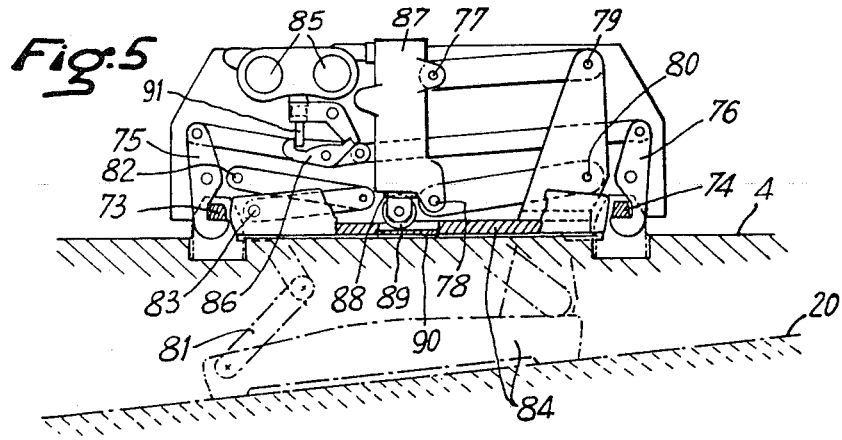

The device illustrated in FIG. 5 constitutes a modified form of embodiment of the structure shown in FIG. 4. It is designed for those cases wherein the load does not tend to escape from a positive engagement with the arm, during the movement of this arm. As a result, the construction is simplified considerably : the arm-to-load connections may be dispensed with, only two anchor rings 73, 74 and corresponding hooks 75, 76 are required, the over-all dimensions are reduced, the irregular parallel motion 77, 78, 79, 80 being disposed between the hooks 75 and 76.

Compass arms or struts 81 pivotally connected at one end to a fixed pin 82 of the ejector and at the opposite end to a pin 83 carried by arm 84 follows the outward movement of the arm in order to impart a greater transverse rigidity thereto.

This arrangement also comprises the power source necessary for operating the ejector, i.e., a pair of pyrotechnic pulse generators 85, the catch-type locking device 86, the cylinder 87 and ejector piston 88. This piston 88 comprises at its lower end a roller 89 in rolling engagement with a bearing surface 90 formed on said arm 84.

When the pulse generators 85 are fired, the small piston 91 releases the catch device 86 and opens the hooks 75 and 76. The ejector piston 88 acting through its end roller 89 exerts a strong thrust against the arm 84 bearing in turn on the upper surface 4 of the load, thus imparting a nose-dive movement to this load and bringing same to the position in which the surface 4 lies at 20 as a consequence of the rotation of said load about an imaginary centre at the rear. This rotation is imparted to the arm by the only possible deformation of the above-defined irregular parallel motion 77, 78, 79, 80, wherein 77 and 78 are the fixed pivot pins and 79, 80 the pivot pins carried by the arm 84.

The only function of compass arms or struts 81 is to impart an additional lateral stability and strength to the arm. It is clear that for a given stroke of piston 88 the load can be caused to tilt more or less about a rear centre by properly selecting the relative dimensions of the irregular quadrilateral (or parallel motion) 77, 78, 79, 80.

Figure 6:
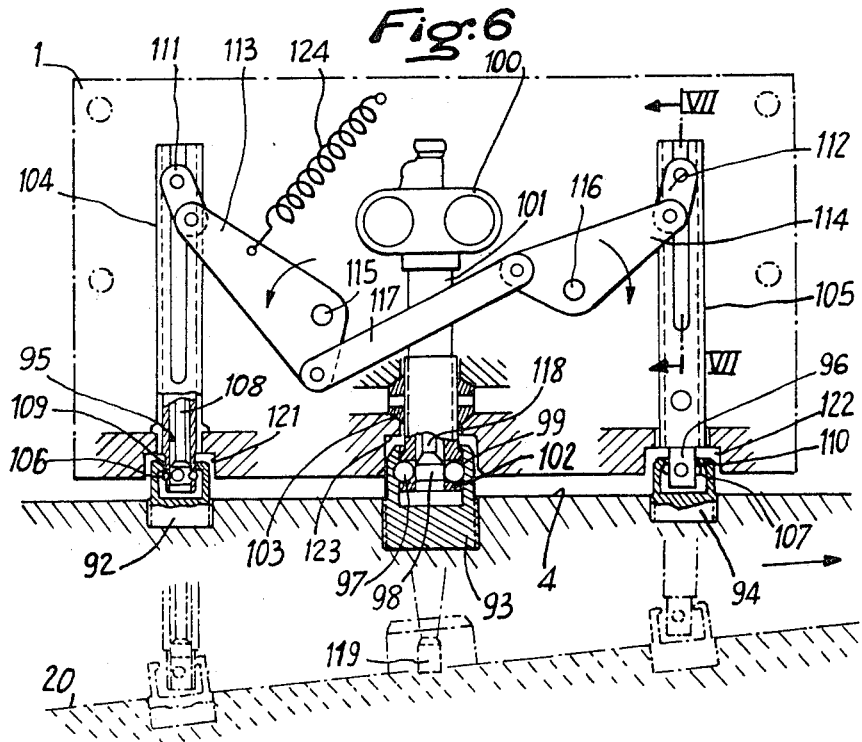
FIG. 6 illustrates an ejector comprising a central push member associated with a pair of front and rear pistons interconnected to produce downward movements of different amplitudes thereof and therefore set the load in the desired release position.

In FIG. 6, the over-all dimensions of the ejector 1 are also shown in phantom lines and 4 designates the upper surface of the load to be jettisoned. This load has secured to three anchor points thereof three sockets 92, 93, 94 of which the main or central one 93 is used for keeping the load in its normal anchoring position. The auxiliary or end sockets 92 and 94 are adapted to connect the load to the pair of follower pistons 95, 96 until the mechanism has completed its stroke.

The socket suspension system is of a known type and it is only necessary to point out that its operation consists essentially in causing a plurality of balls 97 to project transversely by operating a piston 98, so that said balls will bear against a circular inner lip 99 formed in said socket 93. The axial movement of piston 98 causes the balls to register with a circular groove formed above the piston head and thus to move towards the socket axis in order to release the socket.

The reference numeral 100 denotes a pair of pyrotechnic pulse generators operatively connected to a cylinder 101 provided at its lower end 102 with a circular row of balls 97 normally retained in an outer position by the piston 98. Accessorily, the cylinder 101 is externally screw-threaded and engaged by a nut 103 to permit the lifting of the load until it firmly engages bearing means (not shown).

The follower pistons 95, 96 slidably engaging the slide-ways 104 and 105, respectively, also comprise at their lower end a circular row of balls 106, 107 kept in an outward position by coaxial inner rods 108 whereby the balls 106, 107 bear against circular inner lips 109, 110 of auxiliary sockets 92 and 94, respectively, so as to provide auxiliary anchorage means for the load under each piston 95, 96.

These auxiliary pistons 95, 96 are interconnected through a mechanism similar to the one illustrated in FIG. 2, i.e. through links 111, 112, bell-crank levers 113, 114 fulcrumed to fixed pivot pins 115, 116 and a coupling rod 117. Each piston 95 or 96 cannot move downwards without causing a similar movement of the other piston, the strokes of these pistons remaining in a predetermined ratio.

When the cylinder 101 is supplied with fluid pressure the ejector piston 98 is lowered and its constriction 118 enables the balls 97 to retract towards the axis of socket 93. As the piston 98 continues its downward stroke, it exerts a strong pressure against the bottom of socket 93 until it reaches its lowermost position at 119 and ejects the load downwards. The relative movement of the auxiliary sockets 92, 94 resulting from the above-described mechanism causes the load to assume the position in which its upper generatrix lies at 20, as shown in phantom lines, after the load has been rotated in a vertical plane about an imaginary centre at the rear.

Figure 7:
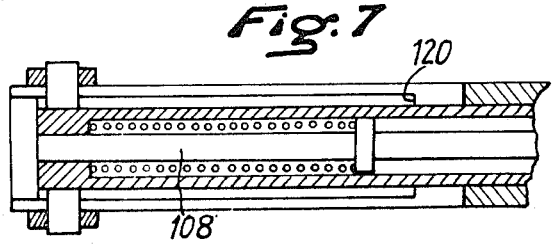
FIG. 7 is a fragmentary section taken along the line VII—VII of FIG. 6, showing a detail.

Both auxiliary pistons 95, 96 attain their lowermost positions simultaneously. The piston rods 108 retained by their relevant abutment shoulders 120 (see FIG. 7) are stopped and permit the inward movement of the balls 106, 107 due to this relative movement. The load having thus been driven to the position in which its upper surface lies at 20 is then released completely.

Accessorily, when the auxiliary sockets 92 and 94 are in their normal position they engage recesses 121, 122 formed to this end in the ejector, thus preventing any yawing movement of the load. Likewise, the main socket 93 engages a recess 123 of the ejector and prevent any longitudinal sliding movement of the load.

Spring means such as 124 may be provided for restoring the auxiliary pistons to their upper position after releasing the load.

Of course, various modifications and variations may be brought to the specific forms of embodiment described, illustrated and suggested herein, without inasmuch departing from the basic principles of the invention as set forth in the appended claims.

We claim:

1. An ejector for jettisoning a load from an aircraft, comprising an ejector mechanism, a pair of longitudinally aligned thrust members adapted to move between a retracted position and an operative position in which they engage directly and simultaneously the load at two separate points of its uppermost surface, separate linkage means associated with each thrust member and pivoted to said ejector mechanism, a coupling rod interconnecting said separate linkage means, a cylinder and piston unit secured at least to one of said separate linkage means and adapted to be supplied with gas under pressure under the control of an electric signal to cause the movement of said thrust members from their retracted position to their operative position, said separate linkage means being capable of applying to said thrust member differential movements causing said two points of the load to be lowered differentially in order to set the load in a desired longitudinal orientation before jettisoning same.

2. Ejector as set forth in claim 16, wherein each thrust member and its corresponding linkage means are constituted by a lever pivoted to said ejector mechanism and comprising at the rear a load suspension hook and at the front a cam extension for suspending the load and pushing same, respectively, during the ejector operation, and the connection of said levers by said coupling rod being such to produce a predertimined ratio between the movements of said cam extensions respectively.

3. Ejector as set forth in claim 1, which includes a pair of vertical longitudinally aligned thrust member each operatively connected to a bell-crank lever fulcrimed to a fixed pivot point an extension of each lever beong connected to one end of said cylinder and piston unit and a connecting rod interconnecting said bell-crank levers, the interconnection of said bell-crank levers being such to produce a predetermined ratio between the movements of said thrust members when passing from their retracted position to their operative position.

4. Ejector as set forth in claim 3, wherein said thrust memeber present suspension elements co-acting with complementary elements of the upper surface of the load and are disposed ahead and astern of a central thrust and suspension member also co-acting with the upper surface of the load, said central thrust and suspension member being adapted to be immediately released while the suspension elements of said thrust members are adapted to be released automaticly after a predetermined downward stroke.

* * * * *